G. W. GULLEDGE.
TIRE PROTECTOR.
APPLICATION FILED FEB. 23, 1918.

1,291,853.

Patented Jan. 21, 1919.

Witnesses

Inventor
George W. Gulledge
By
Attorney

UNITED STATES PATENT OFFICE.

GEORGE W. GULLEDGE, OF BRIARTOWN, OKLAHOMA.

TIRE-PROTECTOR.

1,291,853.	Specification of Letters Patent.	Patented Jan. 21, 1919.

Application filed February 23, 1918. Serial No. 218,779.

*To all whom it may concern:*

Be it known that I, GEORGE W. CULLEDGE, a citizen of the United States, residing at Briartown, in the county of Muskogee and State of Oklahoma, have invented certain new and useful Improvements in Tire-Protectors, of which the following is a specification.

This invention relates to tire protectors, and more particularly to a tire protector of the chain type.

One of the main objects of the invention is to provide a tire protector of simple construction and operation so constructed as to fit snugly about the tire so as to inclose and protect the same, this protector being composed of elements so shaped as to provide traction gripping members which serve to prevent skidding of the wheels. A further object is to provide a protector of relatively great flexibility which will fit about the tread portion and the sides of the tire, this protector being provided with means for quickly and easily securing the same to the rim in which the tire is mounted. Further objects will appear from the detailed description.

Figure 1:
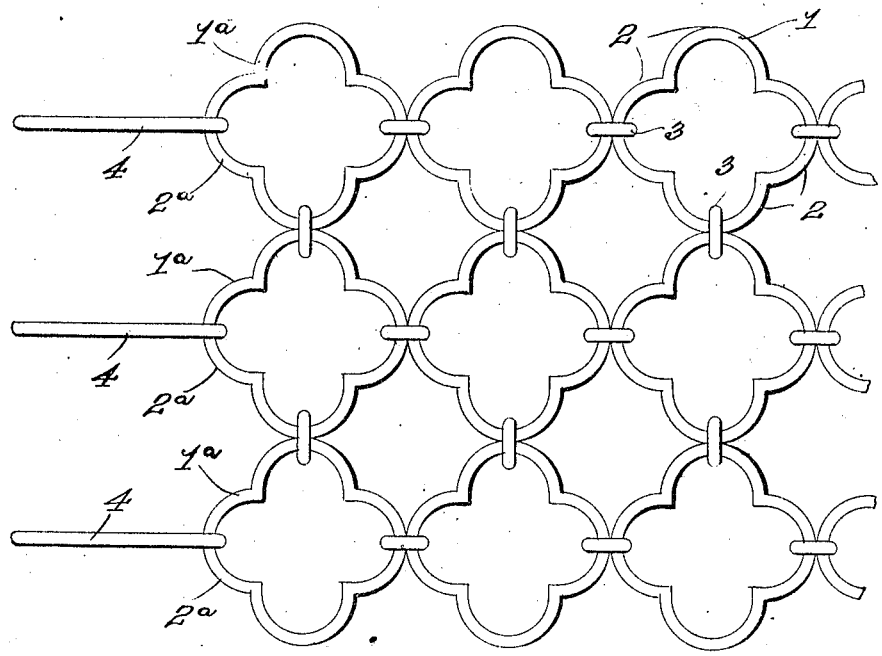
Figure 1 is a fragmentary view of a protector constructed in accordance with my invention shown in extended or spread condition.
Figure 2:
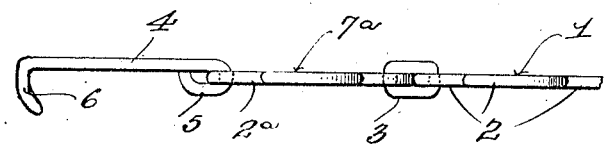
Fig. 2 is an edge view of the same.

In constructing my tire protector I employ a plurality of links 1, these links being composed of the four integrally connected arcuate elements 2. The links 1 are so disposed as to have the elements 2 thereof alined transversely and longitudinally of the protector. The adjacent elements 2 of these links are loosely secured together by connecting links 3 secured about the same at the centers thereof. By this means, the elements composing the body of the chain or protector are loosely secured together so that, when not in use, the chain may be readily folded and the series of links which extend transversely of the protector placed in superposed relation, so as to occupy but very little space.

This protector thus formed is of such width as to fit about the tread portion and the sides of the tire to which it is applied. To permit the protector to be readily applied, I provide attaching means at each side thereof which are adapted to engage with the edge flanges of the rim so as to detachably secure the protector in position. Each of the links 1ª at each side edge of the protector is provided with a securing hook which is loosely secured at its inner end, by an integral eye 5, to the outer arcuate element 2ª of the link. This hook 4 is provided at its outer end with an arcuate bill or finger 6 formed integral therewith, the hook and this finger being made from resilient material. Finger 6 is so curved as to engage over the flange at the side of the rim which carries the tire on which the protector is mounted. In applying the protector, the hooks at one side are engaged over the flange at that side of the wheel, after which the hooks at the other side are engaged over the other flange. The protector is of such width that the second series of hooks engage tightly over the rim flange, being forced into position so as to cause the arcuate fingers 6 to engage tightly about the rim. When the two sets of securing hooks are thus secured to the flanges of the rim, the protector is secured about the tire so as to completely inclose the same. This protector acts in this manner as a reinforcing member for the tire to prevent blowing out thereof, and also serves as an antiskid device and to protect the tire, to a great extent, from injury. This protector is of very simple construction and may be produced at relatively small cost, and as above noted, may be readily applied.

What I claim is:

A tire protector comprising a plurality of links each comprising circumferentially spaced, substantially quarter circular arcuate elements, connecting links secured about adjacent arcuate elements whereby the said first mentioned links are held in equally spaced relation, the length of the said arcuate elements being relatively great whereby the said connecting links are free to move for permitting the larger links to be folded upon each other to occupy a minimum space.

In testimony whereof I affix my signature in presence of two witnesses.

GEORGE W. GULLEDGE.

Witnesses:
D. E. HERSCHELMAN,
W. T. PATTERSON.